A. M. BAILEY & J. O. COUCH.
Improvement in Clothes Wringers.
No. 4,844. Reissued April 2, 1872.
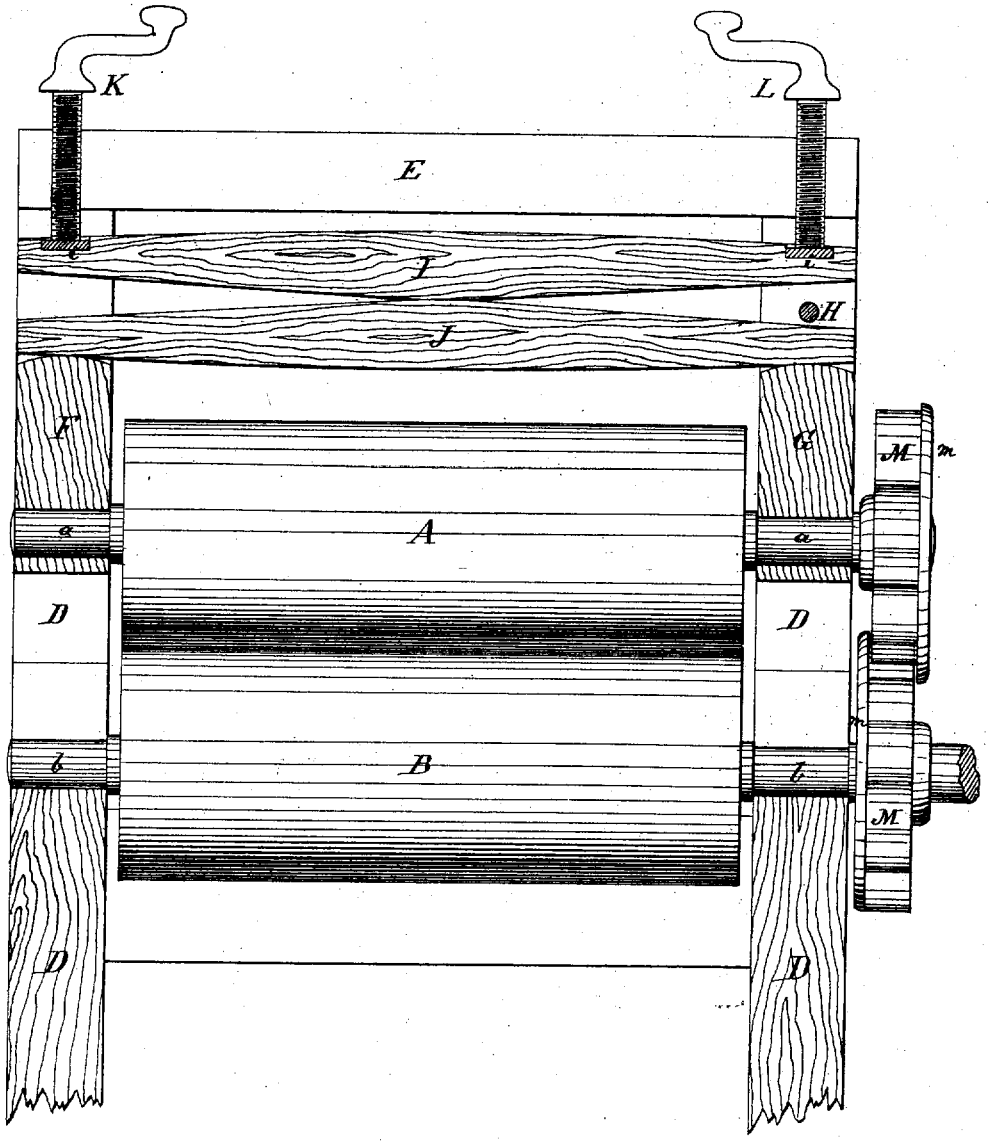
Witnesses.
C. P. Nottingham
D P Howe
Inventor.
Alfred M. Bailey & Jno O. Couch
by atty R Hollock
THE NORRIS PETERS CO., PHOTO-LITHO., WASHINGTON, D. C.

UNITED STATES PATENT OFFICE.

A. M. BAILEY AND JOHN O. COUCH, OF MIDDLEFIELD, CONNECTICUT, ASSIGNORS TO METROPOLITAN WASHING-MACHINE COMPANY.

IMPROVEMENT IN CLOTHES-WRINGERS.

Specification forming part of Letters Patent No. 34,178, dated January 14, 1862; reissue No. 3,755, dated November 30, 1869; reissue No. 4,844, dated April 2, 1872.

*To all whom it may concern:*

Be it known that we, ALFRED M. BAILEY and JOHN O. COUCH, both of Middlefield, in the county of Middlesex and State of Connecticut, have invented a certain new, useful, and important Improvement in Clothes-Wringing Machines; and we do hereby declare that the following is a full, clear, and exact description thereof, reference being had to the accompanying drawing forming a part of this specification, and which represents a vertical section through our machine in the plane of the axes of the rollers.

Our improvement relates in part to the motion of the axes of the rollers, when subject to a strain, in consequence of the reception of large masses of clothing between them. This allows the use of gearing at one end of the rolls to compel both rolls to move simultaneously, preventing the gear-wheels from becoming disengaged when thick masses of clothing are passing between the rolls, and at the same time it allows a very complete and perfect action of elastic strips or springs of any desired form, whether the machine be acting upon thick or thin masses of clothing. Another part of our invention relates to the employment of certain peculiarities in the gear-wheels, by which the motions may be considerable without throwing the machine out of gear.

The drawing represents the form in which we prefer to construct our machine.

A and B are the two rollers, of rubber or other suitable material, and D E is the framing which supports them. The lower roller B rests directly on the bottom of suitable slots in the framing, and is immovable, except to simply rotate on its axis. The upper roller A rests upon B, and is guided and pressed down by boxes F G, which are guided in the said slots so as to be capable of a vertical motion only. The shafts of these rollers project beyond the framing on the right hand side, and carry two suitable gear-wheels, M M, the teeth of which are so formed and so braced by a stout flange, *m m*, at the edge of each, that they will allow the axes *a* and *b* to separate to a considerable extent without disconnecting the gear. J is a spring, of elastic wood, having the form represented, and resting on the boxes F G at each end. I is a corresponding spring in the reverse position, and armed with metals *i i* at the points designated. K L are screws turning in threads in the top of the framing, adapted to press with a desired degree of force upon the plates *i i*, and thus, through the action of the springs I J and the boxes F G, to hold both ends of the roller A down upon B. The shortness and central position of the bearing-surface presented by the springs I J, each to the other, makes the elastic pressure of the springs upon the boxes F G very nearly equal, even when one of the screws K or L is turned down more than the other. H is a stop or small pin, inserted in D at the point represented. It stands directly across the slot in which the box G slides under the action of the elastic force of the springs; but when elevated by any sufficient mass of clothing into contact with this pin its motion is suddenly and positively arrested. The excess of the force, if any there be, elevating the axis *a*, is relieved only by a further upward motion of the box F, which motion is facilitated by the further elastic action, not alone of that end of the springs I and J nearest to the box F, but of the entire length of both these springs, this result being due, in a measure, to the fact that the springs have a central or common bearing intermediate between the two ends of the rolls. The presence of the flange *m* on the side of each gear-wheel M contributes to the result by allowing the teeth to be longer and slenderer than would be otherwise practicable, so that the rolls are capable of an unusual amount of bodily movement to and from each other, and also of an unusual amount of tilting motion. The flange is cast in one piece with the teeth and supports the same very firmly.

In ordinary gear-wheels without flanges the necessity for strength in the roots of the teeth compels the employment of short teeth with a degree of thickness which forbids either a considerable movement of an entire roll toward or from the other, or much tilting of the rolls relatively to each other.

The effect of the entire invention is to produce a novel and very desirable action of the machine, the gears fulfilling their proper function perfectly under all conditions, and the springs acting with full perfection on both ends up to the limit determined by the position of the stop H, and beyond that limit yielding very efficiently by reason of the further rise of the box F at the end opposite the gear, while the box G is rigidly held and the contact of the gears maintained.

Having now described our invention, what we claim, and desire to secure by Letters Patent, is as follows:

1. We claim, in a clothes-wringer of otherwise ordinary or suitable construction, elastic rolls, so mounted in the frame and combined with springs that one end shall be free to play within the capacity of the springs while the other is confined.

2. In combination with elastic rolls mounted in the frame of a wringing-machine, as herein shown, so as to have a more limited play at the geared end than at the other, the employment of a spring or springs having a central or common bearing at a point intermediate between the ends of the rolls.

3. In combination with elastic rolls and springs arranged in the frame of a wringing-machine, so that one of the rolls may have a motion bodily and independently, and also tilt relatively to the other, the employment of flanged gears having flanges cast in one with the teeth, as herein specified.

4. The construction of wringing-machines in which the rolls are operated by gear-wheels in such manner as to allow play to the rolls at the ends nearest the wheels to an extent as will not permit them to be thrown out of gear, and at the other end allow a larger play against a spring or its equivalent, so as to operate upon masses of clothing of different thicknesses, as herein set forth.

In witness whereof we have hereunto set our hands in the presence of two subscribing witnesses.

ALFRED M. BAILEY.
JOHN O. COUCH.

Witnesses:
JOHN E. CURTISS,
WM. P. RICHARDSON.